Figure 1:
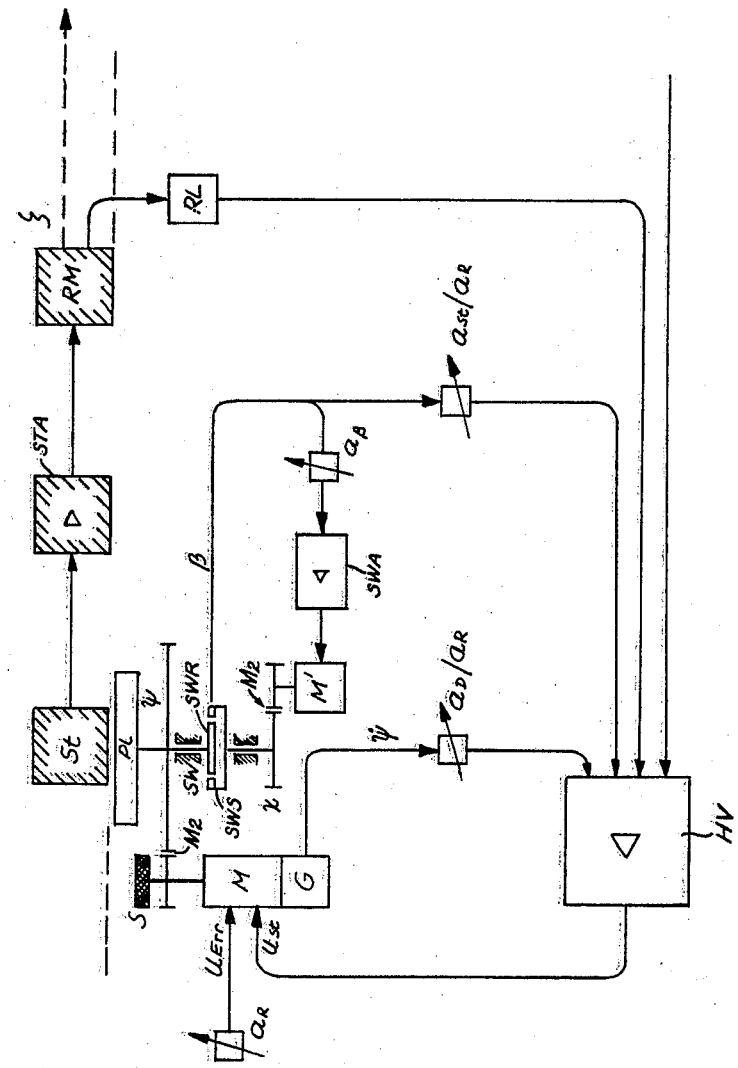

June 15, 1965 W. MÖLLER 3,188,852
TEST DEVICE FOR FLIGHT CONTROLS
Filed Nov. 18, 1959 4 Sheets-Sheet 1

INVENTOR.
WALDEMAR MÖLLER
BY

June 15, 1965     W. MÖLLER     3,188,852
TEST DEVICE FOR FLIGHT CONTROLS

Filed Nov. 18, 1959     4 Sheets-Sheet 4

INVENTOR.
WALDEMAR MÖLLER
BY

United States Patent Office 3,188,852
Patented June 15, 1965

3,188,852
TEST DEVICE FOR FLIGHT CONTROLS
Waldemar Möller, Überlingen (Bodensee), Germany, assignor to Bodenseewerk Perkin-Elmer & Co., G.m.b.H., Überlingen (Bodensee), Germany
Filed Nov. 18, 1959, Ser. No. 853,797
10 Claims. (Cl. 73—1)

This invention relates to a device for testing automatic flight controls. More specifically, the device of this invention permits the behavior of airborne objects under the influence of a control instrument to be thoroughly tested without the necessity of carrying out flight tests. Furthermore, the invention permits the characteristics and parameters influencing the behavior of the airborne object to be varied within required limits.

According to the invention, there is provided a rotatable turn table which accommodates the control equipment under test. The turn table is driven—through a drive gear—by a controllable electric motor, controlled by adjustable dynamic control parameters. The control parameters are derived from the control surface deflection and from the angular velocity of the turn table. Those parameters correspond to the skidding angle and the characteristics of the airborne object, so that the turn table rotation is a representation of the movement of the airborne object's center of gravity.

With such a "dynamic test bench," it is possible to observe in the laboratory, in the course of a few minutes, the dynamic behavior of the aircraft or airborne object under the influence of the flight controls over a wide range of speeds or dynamic pressures, and with any possible parameters of the flight control. The dynamics of interest may be shown on an oscilloscope. With the same ease, the effect of a modification in aircraft design, for example an enlargement of the control surfaces or a modification of the moment of inertia, on the controlled movement may be determined. One may also determine for what type of aircraft and what conditions of flight a particular flight control can be used, as well as where instability begins and the application of flight control would endanger the aircraft.

The invention is equally important in the mass production of flight controls, for the purpose of adjustment and final functional control of each individual instrument. It is additionally useful in current service control, in order to determine time changes of the control characteristics as a result of the wear of individual control elements and thereby exclude possible dangers to the aircraft. With flight control instruments (for instance those for unmanned airborne objects) which have been stocked for a longer period of time, the dynamic test bench permits a rapid determination as to whether or not they are still in perfect operating condition. On an airport or in a missile launching center, the serviceability of flight control instruments can be checked by means of the dynamic test bench before they are put into operation.

An embodiment of the present invention, with several advantageous design features, is given hereafter. The attached drawings represent:

FIG. 1, block diagram of a test device according to the invention.

Figure 2:
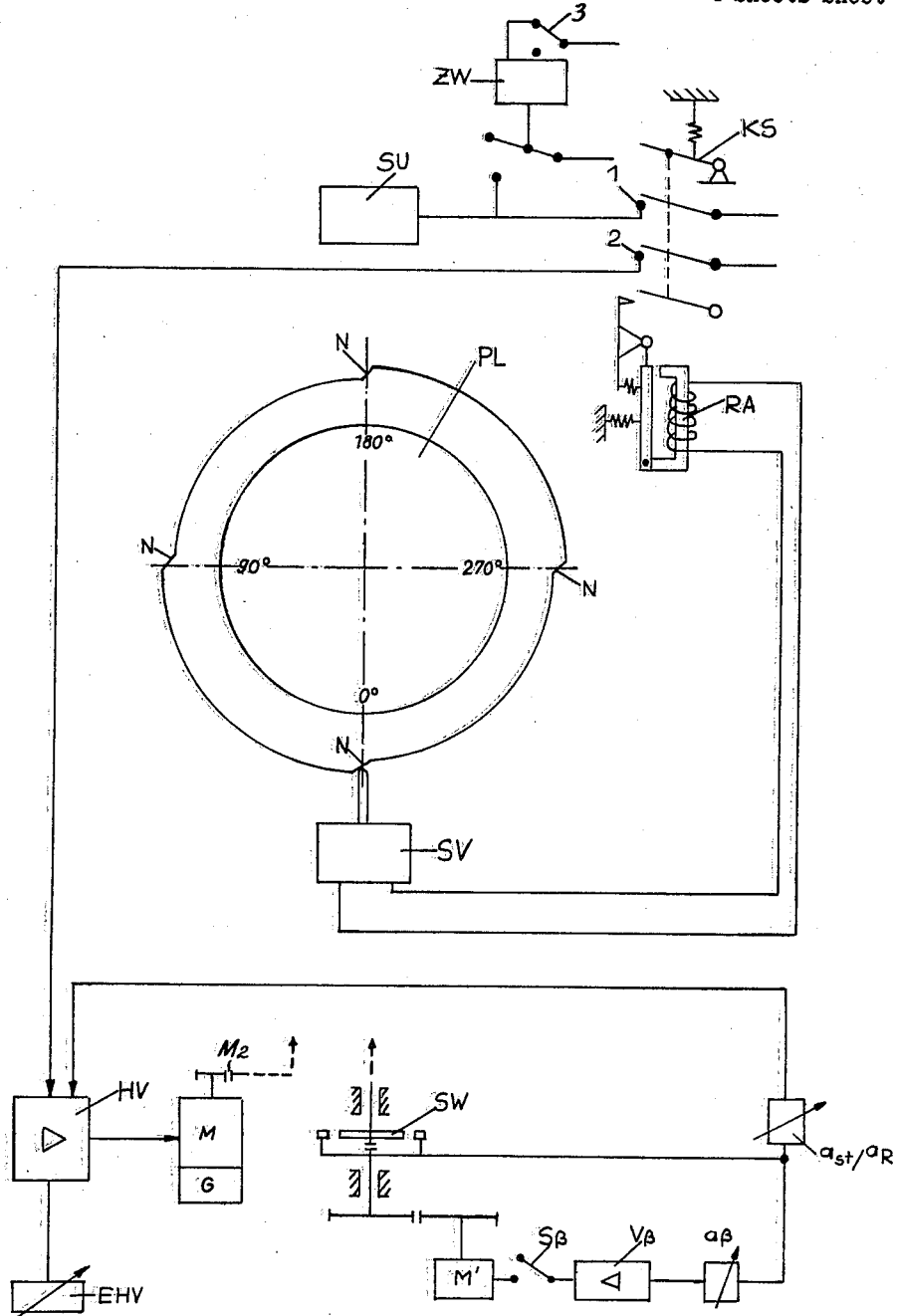

FIG. 2, schematic representation of the means for testing and calibrating the test device.

Figure 3:
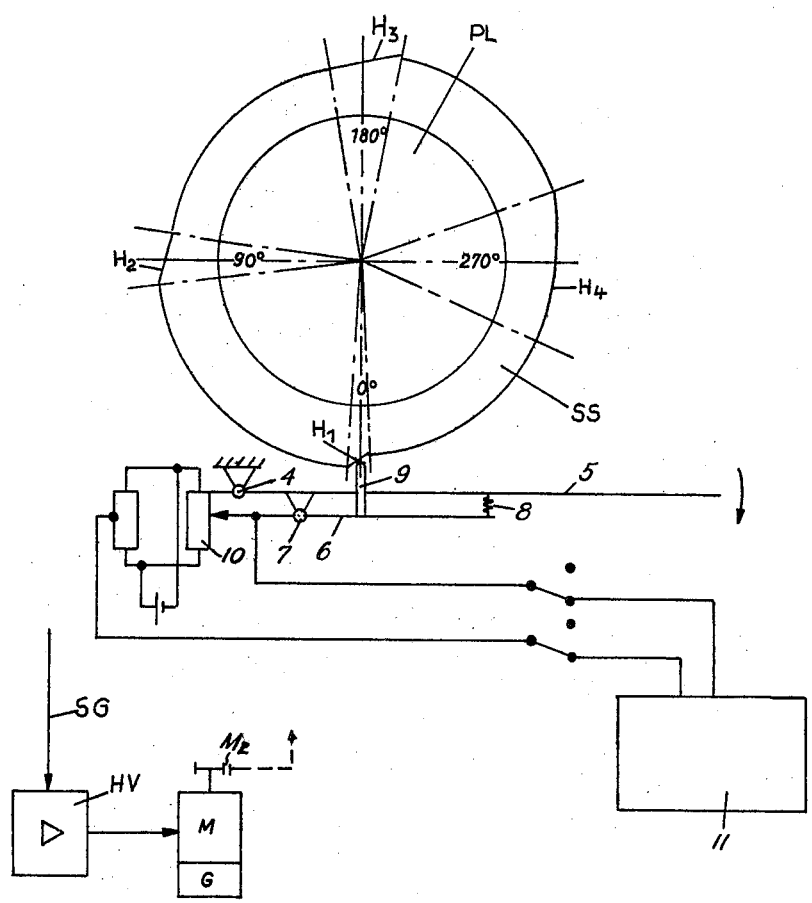

FIG. 3, schematic representation of the means for electric detection of the turn table oscillations.

Figure 4:
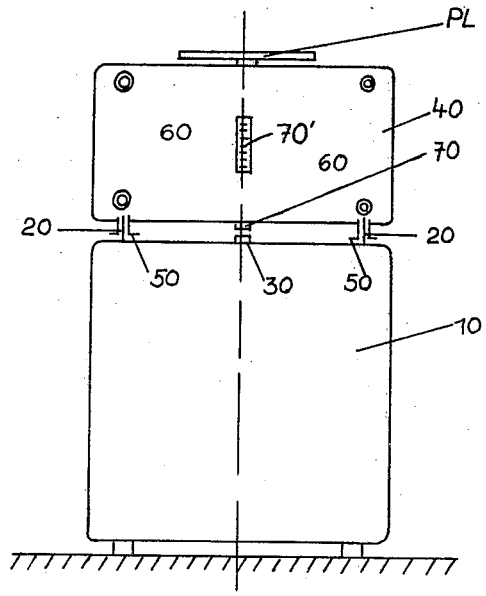
Figure 5:
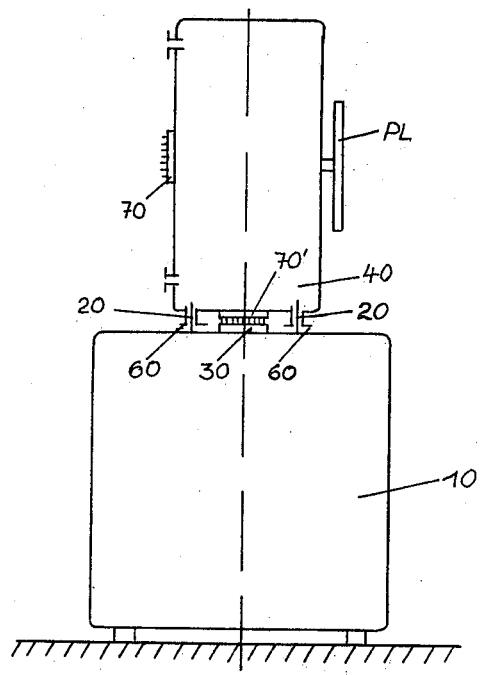

FIGS. 4 and 5, mechanical design of the test devices.

The dynamic test bench is provided with a control surface tap RL which is connected to the control surface, controlled by the servo motor RM of the flight control, and delivers an electric signal proportional to the control surface deflection.

The bench is further provided with a turn table P1 which can be rotated by means of a two-phase electric motor (Ferraris motor) M through a reduction gearing $M_2$. The control instrument $St$ of an autopilot can be fitted to the turn table, its output amplified, if desired, by amplifier STA, and supplied to servomotor RM.

The angular position of the dynamic test bench turn table represents the position angle of the aircraft, for instance the azimuth angle $\psi$.

A deflection of the control surface tap RL from its zero position is represented by a corresponding rotation of the turn table P1 of the dynamic test bench. The relation—both with regard to magnitude and time—existing between the angular position of the turn table and the deflection of RL is subject to the same laws as the relation existing between the position angle of the aircraft and the control surface deflection.

The rotary movements of the aircraft—more accurately: the angular accelerations—are determined by the magnitude of the applied torques and by the moment of inertia I of the aircraft about the axis concerned. On the dynamic test bench, we have the moment of inertia $I'$ of the turn table and the building elements coupled to it: (motor, gearing, control instrument), this is smaller by the factor $f$ (perhaps of the order of magnitude of $10^6$) than the moment of inertia of the aircraft. The turn table will therefore carry out the same rotations as the aircraft, provided the torque generated by the motor is the reproduction—reduced at the ratio of $1:f$—of the torques acting on the aircraft.

As an example, we may consider the case of the heading control, i.e. the case of the rotation of the aircraft about the yaw axis. These rotations are mainly generated by the following torques:

(a) The moment generated by the rudder deflection $\zeta$. It can be considered as approximately proportional to $\zeta$.

(b) The moment of directional stability. It is proportional to the skidding angle $\beta$.

(c) The moment of turn damping. It is proportional to the angular velocity $w_z = \dot\psi$.

(d) In addition, there are "interfering moments" of various origins, for instance due to gusts etc.

The total yawing moment on the aircraft has accordingly the following formula:

$$N = -n_0 w_z - n_{st}\beta - n_R\zeta \;(+ \text{ interfering moments})$$

(with the normal determination of signs $n_0$, $n_{st}$ and $n_R$ are generally positive). The angular acceleration resulting from this is:

$$\ddot\psi = \frac{N}{I_z} = -a_D w_z - a_{st}\beta - a_R\zeta \;(+ \text{ interfering moments})$$

$$= -a_d\dot\psi - a_{st}\beta - a_R\zeta \;(+ \text{ interfering moments})$$

The coefficients $n_0$, $n_{st}$, $n_R$ or $a_D$, $a_{st}$, $a_R$ depend on the aircraft design and on the flying speed and the air density.

On the test bench, the torque generated by the Ferraris motor M, and consequently also the angular acceleration of the turn table P1 is proportional to the product of the exciter voltage $U_{Err}$ and the control voltage $U_{st}$ of the motor:

$$\ddot\psi = c U_{Err} U_{st}$$

The exciter voltage is adjusted—by means of a rotary knob—to a value proportional to $a_R$:

$$U_{Err} = c' a_R$$

It is therefore necessary that the control voltage $U_{st}$ have the following relationship to $\zeta$, $\dot{\psi}$, and $\beta$:

$$U_{st}=c''\left(\zeta+\frac{a_D}{a_R}\dot{\psi}+\frac{a_{st}}{a_R}\beta\right)(+\text{ interfering moments})$$

If this condition is met and if the coefficients $c'$ and $c''$ have been selected appropriately (namely $cc'c''=-1$), the same equation as for the aircraft will apply for the dynamic test bench:

$$\ddot{\psi}=-a_D\dot{\psi}-a_{st}\beta-a_R\zeta \ (+\text{interfering moment})$$

The control voltage for the motor M is supplied by an amplifier HV into which the following input voltages are fed:

(a) A signal proportional to the control surface deflection $\zeta$, supplied by the control surface tap RL, (b) A signal proportional to the speed of rotation $\dot{\psi}$ of the turn table, supplied by a tachometer generator G coupled to the motor M, (c) A signal proportional to the skidding angle $\beta$, supplied by the tap SW, as will be explained later in this application, (d) An interference signal, if required, fed into the test bench from outside.

The signal proportional to the skidding angle is obtained as follows. The skidding angle $\beta$ is the angle between the plane of symmetry of the aircraft and the trajectory tangent. The position of the plane of symmetry is represented on the dynamic test bench by the position of the turn table. The test bench must therefore include a component which represents the direction of the trajectory tangent. It is then possible to represent the required signal by means of a tap provided between this component and the turn table. The azimuth angle of the trajectory tangent is assumed to be $x$; the skidding angle will then be $\beta=\psi-x$. For determination of the angle $x$, the equation $$\dot{\psi}=a_\beta\beta=a_\beta(\psi-x)$$

is used, which results from the equilibrium between the skidding lateral force and the centrifugal force.

As may be seen from FIG. 1, the signal produced by the tap SW, which is proportional to $\beta$, is amplifier by tap amplifier SWA and fed into an integrating motor M' whose speed is proportional to this signal. A reduction gearing M'$_2$ connected to this motor supplies at its drive axis the direction of the trajectory tangent. This axis carries the stator SWS of the tap SW, whereas its rotor SWR is fixed to the axis of the turn table P1.

In the same manner as described for the heading control, the pitch control may be tested by means of the dynamic test bench. In the case of band control, the $\beta$ signal is not used.

$(a_\beta \text{ and } a_{st}=0)$

In order to test a given aircraft under a given flight condition, one must know the four parameters (for each axis)

$a_R$, $a_D$, $a_{st}$ and $a_\beta$ $a_R$ must be considered the most important as it characterizes the aircraft insofar as flight control is concerned. It has the physical meaning:

*Angular acceleration divided by control surface deflection*, and the dimension sec.$^{-2}$.

With a well designed flight control, the remaining parameters $a_D$, $a_{st}$, $a_\beta$, are often of less importance. In most cases, it is possible to obtain a relatively correct picture of the behavior of the aircraft with the flight control, by assuming $a_\beta=0$. A rough approximation may even be possible by assuming $a_D=a_{st}=a_\beta=0$. As already stated, adjustment of the parameter $a_R$ on the test bench is effected by means of the exciter voltage of the motor M.

The upper limit of the adjustable $a_R$ values is determined by the characteristics of the test bench, in particular by the characteristics of the drive motor M. It is advisable not to place excessively large and heavy instruments on the turn table P1, as the moment of inertia of the control instruments is added to that of the turn table, thus reducing the possible values of angular acceleration. In general, tests should be carried out at a definite "standard value" of the moment of inertia I'. If the moment of inertia—with mounted control instruments—is below this value, it is set to the standard value by the addition of correcting discs in the shaft of the motor M. In addition, there are discs S which allow the moment of inertia I' to be adjusted to 10x or 100x the standard value. Smaller values of $a_R$ can then be more easily set.

Instead of the Ferraris motor M, described in this embodiment of the invention, another controllable asynchronous motor can also be used. As the driven turn table P1 is to simulate the movements of the airborne object, it is necessary to keep friction very low and to provide a motor without collectors and with such a sensitivity that its starting torque is one thousandth of the full torque, and even smaller if possible.

The interference moment to be added, if required, to the control of the motor M can serve for the representation of gusts. It can, for example, be taken from a computer which determines the influence exercised, for instance, during the test of a control instrument by aircraft inclination about the pitch or roll axes. It is possible to couple together, through the intermediary of such a computer if required, several test devices of the type described, so that control instruments can be tested simultaneously for the three axes of the airborne object, taking into consideration the influence they exercise on each other.

The device shown in FIGURE 2 will carry out in a convenient way the current control and adjustment of the parameters of the equation of moments, taking into consideration the necessary amplifiers.

In accordance with the invention, this problem is essentially solved by incorporating a chronometric system for the calibration and adjustment of the test device. The chronometer can be disconnected automatically by a switching device controlled by the movements of the turn table. The invention is based on the knowledge that a check of each parameter can be obtained by a time measurement of the turn table motion.

It is advisable to connect the chronometric system by means of a control switch which connects a particular control parameter to the test device. For calibration and adjustment of the test device, it is necessary, among other items, to correlate a definite rotary acceleration of the turn table with a definite input signal. The rotary acceleration = $\epsilon$ of the turn table can be derived from the time = $t$, which the turn table requires for a definite angular distance $$=\varphi\cdot\left(t=\sqrt{\frac{2\varphi}{\epsilon}}\right)$$

If therefore, simultaneously with the connection of the chronometric system, a definite control signal is connected to the test device, whose turn table automatically disconnects the chronometric system after a 90° or 180° rotation, the time = $t$ can be read directly and the rotary acceleration of the turn table can be determined in accordance with the above formula and be correlated with the control signal. This way, the amplifier can be checked and, if necessary, the gain be reset.

If, instead of the control signal, the signal of a control surface potentiometer is connected to the test device at a definite control surface position, it is possible to measure the rotary acceleration of the turn table at that position and to compare it with the provided rated value, so that adjustment of the control surface efficiency is possible. If the rotary acceleration corresponding to a definite signal of the control surface potentiometer is not reached or exceeded, this shows that the mechanical link between the control surface potentiometer and the control surface of the airborne object does not correspond to the specified transmission ratio and must be changed.

Simultaneously with a particular control signal, a damping signal may be connected to the test device which is generated by a tachometer generator G coupled with the turn table drive motor M. A turn table rotational speed will then be obtained which can be determined without difficulty by means of the chronometric system and compared with the rated value. Thus, it is possible to examine and adjust the damping signal.

Another embodiment of the invention provides for connection and disconnection of the chronometric system by means of a counter which counts a definite number of oscillations of the turn table. As described above in more detail, a stabilizing signal proportional to the skidding angle $\beta$ is supplied by the tap SW, whose rotor SWR is connected to the turn table and whose stator SWS is rotated by an integrating motor M'. The dynamic effect of this stabilizing signal can be checked and set in the following way. If, at zero position of the turn table, a definite signal from the tap is connected to the test device, the turn table—after disconnection of the integrating motor M' and after being pushed—will oscillate about the zero position with a definite frequency. The frequency depends on the magnitude of the signal supplied by the tap SW and on the excitation of the turn table drive motor. By means of the chronometric system, in conjunction with the counter counting the turn table oscillations, it is possible to determine the oscillation frequency of the turn table and to compare it with a rated frequency corresponding to a definite signal level. In practice, the arrangement is made in such away that the chronometric system is connected by the counter at the first oscillation and disconnected at the tenth oscillation.

In the above way, it is possible to examine and set, by means of the chronometric system and by means of appropriate switching measures, all parameters of the equation of moments, the gain factor, the control surface efficiency, the damping signal and the stabilizing signal.

The turn table P1, provided for accommodation of the flight control instrument, is connected to a control disc SS, provided with four control cams N displaced by 90° with regard to each other. These cams act on a switching device SV. A manually operated control switch KS, which can be released by the relay RA, is connected to the switching device SV. This switch connects—through its contact 1—a synchronous clock SU, and simultaneously—through its contact 2—a control signal to the main amplifier HV of the test device. As stated above, a low inertia motor M for the drive of the turn table P1 is connected to the main amplifier HV. The motor M is coupled to a tachometer generator G. The rotor of tapping system SW is rotated together with turn table P1. The stator is rotated—by means of a gearing M'$_2$—by an integrating motor M'. The integrating motor M' is connected by means of a switch S$_\beta$ to an amplifier V$_\beta$, whose input is connected—through an adjusting means $a_\beta$—to the tapping system SW. The tapping system SW is further connected—through an adjusting means $a_{st}/a_R$ to the input of the main amplifier HV, whose gain can be adjusted by means of the adjustment device EHV. By means of the switch S$_\beta$ a contact type counter ZW can be connected upon disconnection of the integrating motor M'—to the amplifier V$_\beta$.

The counter ZW serves for connection and disconnection of the synchronous clock SU. It is so arranged that it connects the clock SU at the first pulse and disconnects it at the twentieth pulse. A pulse is emitted each time the voltage tapped at the tapping system SW passes through zero, so that ten full oscillations are counted.

For checking and adjusting the main amplifier HV, the control switch KS is operated and thus the synchronous clock SU is connected and simultaneously a control signal is passed through contact 2 to the main amplifier HV, under whose influence the turn table P1 is accelerated. After a definite angular movement of 90°, 180° or 270°, the switching device SV is operated by a cam N on control disc SS which in turn energizes the release relay RA, which disconnects the synchronous clock SU. From the time indicated by the synchronous clock, the angular acceleration of the turn table P1 can be deduced as stated above, and compared with a rated value corresponding to the control signal. By adjustment of the gain on the adjustment device EHV, coincidence with the rated value can be obtained.

Instead of the control signal, a signal from a control surface potentiometer can be connected to the main amplifier HV through contact 2, and the angular acceleration of the turn table P1 can be determined in the same way. Coincidence with the rated value can then be obtained by adjustment of the control surface potentiometer. If, simultaneously with the control signal, a damping signal taken from the tachometer generator G is connected to the main amplifier, the angular speed of the turn table P1 is a measurement of the efficiency of the damping signal. This angular speed can easily be determined from the chronometric value indicated by the synchronous clock SU after a full rotation of the turn table P1.

For adjustment and checking of the stabilizing signal, the switches S and 3 are thrown in such a way at the zero position of the turn table P1 that the integrating motor M' is disconnected from the amplifier V$_\beta$ and the counter ZW connected. If the turn table is pushed—with disconnected damping—it will oscillate about its zero position, with a frequency dependent on the setting of the adjustment means $a_{st}/a_R$. As soon as the voltage taken from the tapping system SW passes through zero during the first oscillation, the counter ZW obtains the first pulse and connects the clock SU. After the tenth oscillation of the turn table P1, the synchronous clock SU is disconnected, so that it indicates the time consumed for ten full oscillations. The frequency of the turn table oscillation can then be calculated as a measure of the stabilizing signal taken from the tap. Coincidence with the rated value can be obtained by operation of the adjustment means $a_{st}/a_R$.

With the described test device, the movements to be executed by the airborne object about the center of gravity under the influence of both external interference moments and reaction of the control instruments, are represented as turn table movements. Frequently these are transient oscillations whose amplitudes depend on the magnitude of the connected interference moments and the reaction of the control instrument to be tested. It is very advantageous if these transient oscillations can be recorded with maximum sensitivity and accuracy or shown on an oscilloscope. For this purpose, a recording potentiometer or similar device can be provided having a cam rider controlled in accordance with the angular deflections of the turn table. If the rider is dimensioned in accordance with the maximum oscillation amplitudes of the turn table, amounting for instance to ±30° recording will become insensitive and inaccurate at small oscillation amplitudes (for instance ±5°).

The object of the device according to FIG. 3 is to allow recording of the turn table oscillations with sufficient sensitivity in spite of varying amplitudes. According to the invention, this is obtained by the fact that the turn table is connected to a control disc provided with several cams, displaced with regard to each other, and covering different angular ranges for the control of a rider. For the control of the recorded potentiometer cam rider, one of these cams whose slope is adapted to the expected oscillation amplitudes, can be selected. The cam with the maximum slope, i.e. the one which covers only a small angular range, will be used with small oscillation amplitudes. For larger oscillation amplitudes, the cams with correspondingly flatter slope can be used. By this system, the recording potentiometer will be fully controlled by one cam for each angular range, with the turn table and its attached control disc being displaced in such a way that, in each case, the center of the cam to be used determines the zero point.

In another embodiment of the invention, the recording potentiometer rider applied to the cam by means of a control element, is spring loaded and seated on an adjusted lever supporting the recording potentiometer. For the purpose of protecting the potentiometer and the cams, the lever can be adjusted away from the control disc and the rider put out of operation if it is not required for further tests.

A control disc SS is connected to the turn table P1. The turn table P1 is driven as stated above by a low inertia electric motor which is coupled to a tachometer generator G. The electric motor is fed from a main amplifier HV, which among other items—is controlled by an interference magnitude marked by an arrow SG.

The control disc SS is provided with four cams $H_1$–$H_4$, whose centers are displaced by 90° with regard to each other. The cam $H_1$ covers an angular range of ±5°, it has accordingly a relatively steep slope. The cams $H_2$, $H_3$ and $H_4$ cover larger angular ranges of ±10, and ±20°, and ±30°.

On a lever 5, pivoted at 1, a rider 6 is orientably positioned at 7 and supported by a spring 8. A control pin 9 is connected to the rider 6 and applied to one of the cams $H_1$ to $H_4$, according to which one of the came $H_1$ to $H_4$ has been put into operation by displacement of the turn table P1. The rider 6 taps a measuring voltage from a bridge connected recording potentiometer 10. The recording potentiometer 10 is located on the lever 5. The tapped measuring voltage is fed into a recorder such as an oscilloscope 11.

If the turn table P1 makes a transient oscillation under the influence of the interference moment SG and the reaction of the control instrument to be tested, the rider is accordingly controlled through the intermediary of the control pin and the cam $H_1$, and taps a measuring voltage from the recorder potentiometer 10, representing the oscillation of the turn table P1 whose curve is recorded on the instrument 11. If for this purpose, the steep slope cam $H_1$ is used, the recorder potentiometer 10 is fully controlled over its entire range with turn table oscillation amplitudes of ±5°. If the turn table P1 is rotated to a zero position, where the cam $H_2$ is in contact the control pin 9, a full potentiometer range control is obtained with oscillation amplitudes of ±10°. When using the cams $H_3$ and $H_4$, full potentiometer range control is obtained at ±20° and ±30°, respectively.

If no recordings are made, the recorder unit 11 is disconnected and lever 5 oriented away from the control disc SS. The turn table P1 can then move freely for other tests without friction from the control pin 9.

When testing flight control instruments, in particular those required for pitch and roll control of the aircraft, gravity influences must be considered which are excluded with a horizontal arrangement of the turn table, such as represented in schmatic FIG. 1. In order to be able to carry out such tests in a simple way, the test device of the invention is so arranged that the turn table and its drive system are accommodated in a separate housing which can be positioned either horizontally or vertically on a rack-type base compartment containing the amplifier unit. For this purpose, the base compartment is provided with four positioning pins on the top face, while the bottom and one lateral face of the top housing are each provided with four matching positioning sockets.

The connections of the top housing are connected to two multiple plugs. When placing the top housing on the base, one of these is introduced into a matching socket in the base compartment. In this way, it is possible to use the test device both with the horizontally and the vertically positioned turn table, without having to undertake time-consuming operations for the establishment of the necessary conections.

FIG. 4 shows the test device with horizontally positioned turn table. FIG. 5 shows the test device with vertically positioned turn table.

A rack-type base compartment 10, containing the main amplifier, power supply, voltage stabilizer, etc., is provided—on its top surface—with four positioning pins 20 and the socket for a multiple plug 30. The top housing 40 with the turn table P1 and the drive and adjustment means can be placed on the positioning pins 20. On its bottom and on one lateral face, the instrument top housing 40 is provided with positioning sockets 50 and 60 to fit into the positioning pins 20. It is therefore possible to place the positioning sockets 50 of the top housing 40 on the positioning pins 20 (FIG. 1) to provide for a horizontal arrangement of the turn table P1. It is also possible to introduce the positioning pins 20 into the positioning sockets 60 (FIG. 2), so that the top housing is tilted by 90° and the turn table accordingly provided in a vertical position. The electrical connections of the top housing 40 are connected to two multiple plugs 70, 70', which are so arranged that in each case one of them (either 70 or 70') is introduced into socket 30 of the base compartment when placing the top housing on it.

I claim:

1. Apparatus for the testing of autopilots which comprises turntable means adapted to support a unit under test; variable speed electric motor means having a manually variable field adjustment means which can be set in accordance with the characteristics of an object ordinarily controlled by the autopilot, said motor means being in driving relationship to said turntable means; first signal generating means having a first output proportional to a simulated skidding angle; second signal generating means having a second output proportional to control surface deflection; third signal generating means having a third output proportional to the rotational velocity of said turntable means; and control means responsive to said first, second, and third outputs to control said variable speed electric motor means.

2. The apparatus of claim 1 wherein said motor means comprises a two phase motor having a first winding energized in accordance with the characteristics of a controlled object and a second winding energized by said control means.

3. The apparatus of claim 1 wherein said first signal generating means comprises a voltage pickoff having a first rotatable element positionable in accordance with the direction of the tangent to a simulated flight path, a second rotatable element positionable in accordance with the heading of a simulated controlled object, and means for producing an output signal proportional to the angular difference between said tangent and said heading.

4. The apparatus of claim 2 wherein said motor means includes means for adjusting the moment of inertia of said motor means and said turntable means.

5. The apparatus of claim 1 wherein said turntable means includes means for selectively positioning said turntable for rotation about one of a vertical and horizontal axis.

6. Apparatus for the testing of autopilots which comprises turntable means adapted to support a unit under test; variable speed electric motor means in driving relationship to said turntable means; first signal generating means having a first output proportional to a simulated skidding angle; second signal generating means having a second output proportional to control surface deflection; third signal generating means having a third output proportional to the rotational velocity of said turntable means; control means responsive to said first, second, and third output to control said variable speed electric motor means; timing means operable during the rotation of said turntable means; and actuating means adapted to actuate said timing means during a predetermined movement of said turntable.

7. The apparatus of claim 6 wherein said actuating means includes means for applying a control parameter signal to said control means.

8. The apparatus of claim 6 wherein said actuating means actuates said timing means during a predetermined angle of rotation of said turntable means.

9. The apparatus of claim 6 wherein said actuating means actuates said timing means during a preselected number of oscillations of said turntable means.

10. The apparatus of claim 8 wherein said actuating means includes cam means rotatable with said turntable means.

References Cited by the Examiner
UNITED STATES PATENTS 2,700,888   1/55   Good et al. _____ 73—1
2,704,644   3/55   Good et al.

ISAAC LISANN, *Primary Examiner.*